United States Patent
Lu

(10) Patent No.: US 9,889,626 B2
(45) Date of Patent: Feb. 13, 2018

(54) ENVIRONMENTALLY FRIENDLY ANTI-SLIP FLOOR MAT

(75) Inventor: Xiangyang Lu, Xiamen (CN)

(73) Assignee: XIAMEN SHEEP ANTI-FATIGUE MAT CO., LTD., Xiamen (CN)

( * ) Notice: Subject to any disclaimer, the term of this patent is extended or adjusted under 35 U.S.C. 154(b) by 540 days.

(21) Appl. No.: 14/774,144

(22) PCT Filed: May 25, 2012

(86) PCT No.: PCT/CN2012/076093
§ 371 (c)(1),
(2), (4) Date: Sep. 10, 2015

(87) PCT Pub. No.: WO2013/174016
PCT Pub. Date: Nov. 28, 2013

(65) Prior Publication Data
US 2016/0023424 A1    Jan. 28, 2016

(51) Int. Cl.
| | |
|---|---|
| B32B 3/24 | (2006.01) |
| B32B 3/26 | (2006.01) |
| A47G 27/02 | (2006.01) |
| B29C 45/14 | (2006.01) |
| B32B 3/30 | (2006.01) |
| B32B 9/02 | (2006.01) |
| B32B 5/32 | (2006.01) |

(Continued)

(52) U.S. Cl.
CPC .......... *B32B 3/266* (2013.01); *A47G 27/0212* (2013.01); *B29C 45/14811* (2013.01); *B32B 3/30* (2013.01); *B32B 5/32* (2013.01); *B32B 9/025* (2013.01); *B32B 9/045* (2013.01); *B32B 27/065* (2013.01); *B32B 27/40* (2013.01); *B29K 2009/06* (2013.01); *B29K 2075/00* (2013.01); *B29K 2311/08* (2013.01); *B29L 2009/00* (2013.01); *B32B 2266/0207* (2013.01); *B32B 2266/0278* (2013.01); *B32B 2305/022* (2013.01); *B32B 2307/744* (2013.01); *B32B 2471/04* (2013.01)

(58) Field of Classification Search
CPC ............ B32B 3/266; Y10T 428/24339; Y10T 428/24347
See application file for complete search history.

(56) References Cited

U.S. PATENT DOCUMENTS

| | | | |
|---|---|---|---|
| 5,154,961 A | 10/1992 | Reuben | |
| 2005/0129910 A1* | 6/2005 | Chang | B32B 3/26 428/139 |

FOREIGN PATENT DOCUMENTS

| | | |
|---|---|---|
| CA | 2427020 A | 10/2003 |
| CA | 2432204 C | 8/2006 |

(Continued)

*Primary Examiner* — William P Watkins, III
(74) *Attorney, Agent, or Firm* — Gokalp Bayramoglu

(57) ABSTRACT

This invention provides an environmentally friendly anti-slip floor mat, includes a leather, a polyurethane middle layer, a PU self-skinning layer and an anti-slip layer stacked together. The polyurethane middle comprises non-foam polyurethane. The PU self-skinning layer comprises foaming polyurethane. A plurality of through holes running through the anti-slip layer are located in the anti-slip layer. A surface of the PU self-skinning layer adjacent to the anti-slip layer further comprises a plurality of rivets pass through the through holes and extend to a surface of the anti-slip layer away from the PU self-skinning layer.

9 Claims, 5 Drawing Sheets

(51) Int. Cl.
  *B32B 9/04*      (2006.01)
  *B32B 27/06*     (2006.01)
  *B32B 27/40*     (2006.01)
  *B29K 9/06*          (2006.01)
  *B29K 75/00*         (2006.01)
  *B29K 311/08*        (2006.01)
  *B29L 9/00*          (2006.01)

(56) References Cited

FOREIGN PATENT DOCUMENTS

| | | | |
|---|---:|---|---|
| CN | 2930514 | Y | 8/2007 |
| CN | 200973595 | Y | 11/2007 |
| CN | 201899312 | U | 7/2011 |
| CN | 1524674 | A | 9/2011 |
| CN | 102188147 | A | 9/2011 |
| FR | 2143412 | A3 | 2/1973 |
| FR | 2667430 | A3 | 4/1992 |

\* cited by examiner

ENVIRONMENTALLY FRIENDLY ANTI-SLIP FLOOR MAT

CROSS REFERENCE TO RELATED APPLICATIONS

This application is the national phase entry of International Application No. PCT/CN2012/076093, filed on May 25, 2012, and the entire contents of which are incorporated herein by reference.

TECHNICAL FIELD

This invention relates to a floor mat, especially relates to an environmentally friendly anti-slip floor mat.

BACKGROUND

Nowadays, the PU (Polyurethane) self-skinning floor mat is directly foamed by the foam material Polyurethane. Such PU self-skinning floor mat has the advantages of: good elasticity, better foot feels, ease to clean and environmentally friendly. However, this PU self-skinning floor mat cannot be directly used in a damp environment, such as kitchen, bathroom, etc., because the friction between the floor mat and the ground is too small, which lower the safety of the floor mat. In order to solve the problem of slipping, industry insiders tend to directly add an anti-slip foaming layer on the bottom surface of the PU self-skinning floor mat. The anti-slip foaming layer is made of choroprenerubber, styrenebutadienerubber, heat-shrink elastomer foaming layer or rubber foaming layer. Slip resistance of the floor mat gets enhanced by applying the anti-slip foaming layer. However, the PU self-skinning layer and the anti-slip foaming layer are two different kinds of materials, which makes them have low binding capacity and hard to combine. The PU self-skinning and the anti-slip foaming layer are easy to separate from each other, which influences the quality and service life of the product.

Therefore, Inventor here makes a structural development to the existing PU self-skinning floor mat and invents an environmentally friendly anti-slip self-skinning floor mat adapted for damp condition such as kitchen and so on.

SUMMARY OF THE INVENTION

The object of this invention is to provide an environmentally friendly anti-slip floor mat, which has the advantages of good elasticity, better foot feels, anti-slip, ease to clean, environmentally friendly and good quality.

An environmentally friendly anti-slip floor mat comprises, a PU self-skinning layer, a middle layer, and an anti-slip layer stacked together in that order;

The middle layer is a thin layer with the same or similar material as the PU self-skinning layer, and configured to bond with the PU self-skinning layer by foam molding. The top surface of the anti-slip layer is glued to the middle layer, and multiple of rivet holes are set on the glued middle layer and anti-slip layer. The foamed PU self-skinning layer is located on the top surface of the middle layer, and bonded to the top surface of the middle layer by foaming molding. During foaming process, the bottom surface of the PU self-skinning layer runs through the rivet holes and sticks out of the bottom surface of the anti-layer a bit and finally expands to form multiple of rivet. With the rivet connection, the PU self-skinning layer can bond with the anti-slip layer in a further step.

Wherein, said middle layer is PU foam layer.

Said glue is VAC, Polyurethane adhesive, or natural latex and so on.

Said rivet holes on the anti-slip layer is rhombus.

Furthermore, said anti-slip layer is made of choroprenerubber, styrenebutadienerubber, heat-shrink elastomer foaming layer or rubber foaming layer.

Furthermore, said rubber foaming layer is made of chloroprene rubber or styrene butadiene rubber.

Furthermore, a surface of said anti-slip layer away from said PU self-skinning layer further comprises an anti-slip texture.

Furthermore, said anti-slip layer has a plurality of convex granules.

Furthermore, the plurality of convex granules are concaved to form a plurality of suction cup structures.

The invention adds a middle layer between the PU self-skinning layer and the anti-slip layer. The middle layer is firstly glued to the anti-slip layer, and the anti-slip layer is subsequently placed in the mold. Moreover, the middle layer is made of the same or similar material as the PU self-skinning layer, such that the middle layer and the PU self-skinning layer can be directly bonded together by foaming in the mold with teeming method, such that the PU self-skinning layer is fixed and combined with the anti-slip layer. At the same time, because a plurality of rivet holes are formed on the anti-slip layer and the bottom surface of the PU self-skinning layer is formed with a plurality of rivets, the PU self-skinning layer and the anti-slip layer can be firmly bonded together via the rivet connection between the rivet holes and rivets. The rivet holes can also perform the function of air exhaust. The rivets which stick out the bottom surface of the anti-slip layer can anti slipping in a further step. Thus, the final product would not causing bubbles, has a high resistance to the separation of different layers and more secure quality and longer service life. Moreover, the product has the advantages of higher elastic, better foot feels, anti-slip, ease of clean and environmentally friendly.

Hereinafter, this invention will be described in detail combined with the drawings and embodiments.

Description of the Numerals

Figure 1:
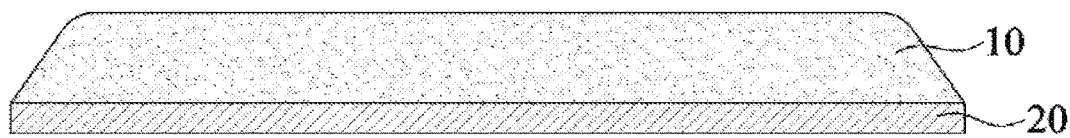
FIG. 1 illustrates a schematic diagram of the environmentally friendly anti-slip floor mat.

PU self-skinning floor mat 10; Anti-slip foaming layer 20; PU self-skinning layer 1; Rivet 11; Middle layer 2; Glue 3; Anti-slip layer 4; Anti-slip convex granules 41; Rivet hole 5

DETAILED DESCRIPTION OF THE INVENTION

Figure 2:
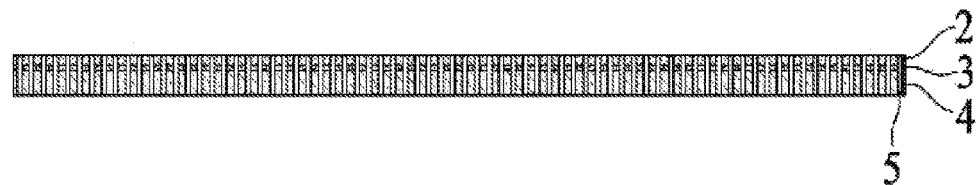
FIG. 2 illustrates a schematic diagram of the middle layer glued on the anti-slip layer having a plurality of rivet holes.
Figure 2A:
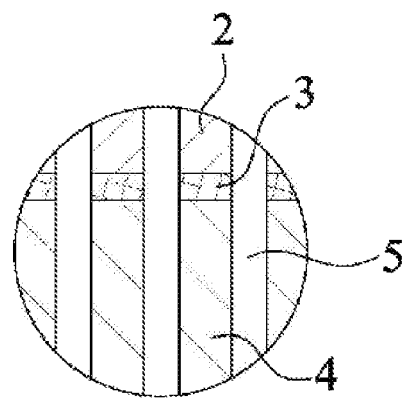
FIG. 2A illustrates an enlarged partial view of FIG 2.
Figure 3:
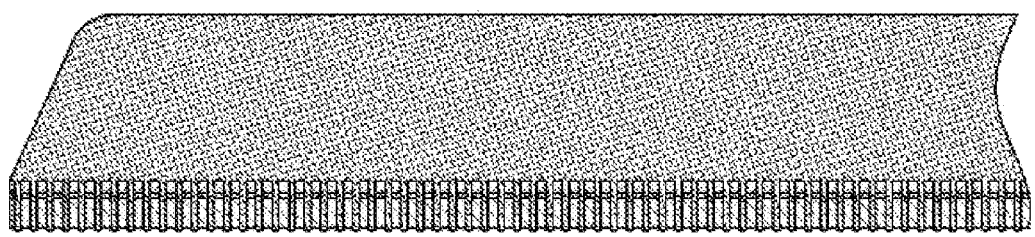
FIG. 3 illustrates a schematic diagram of the first embodiment of this invention.
Figure 3A:
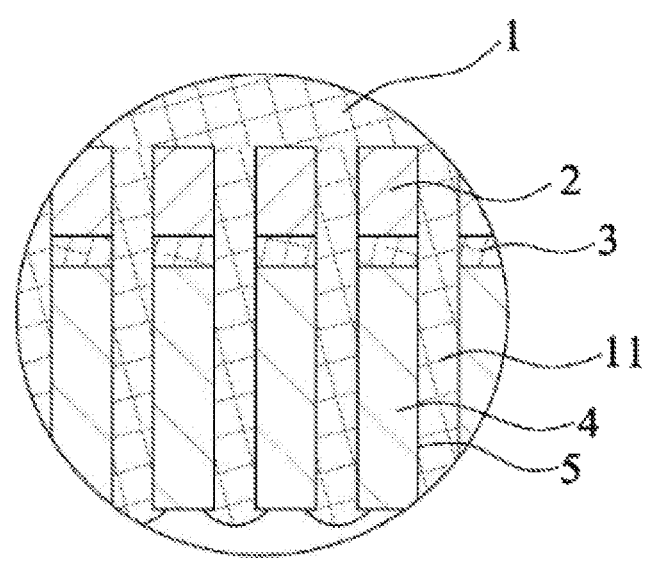
FIG. 3A illustrates an enlarged partial view of FIG. 3.
Figure 5:
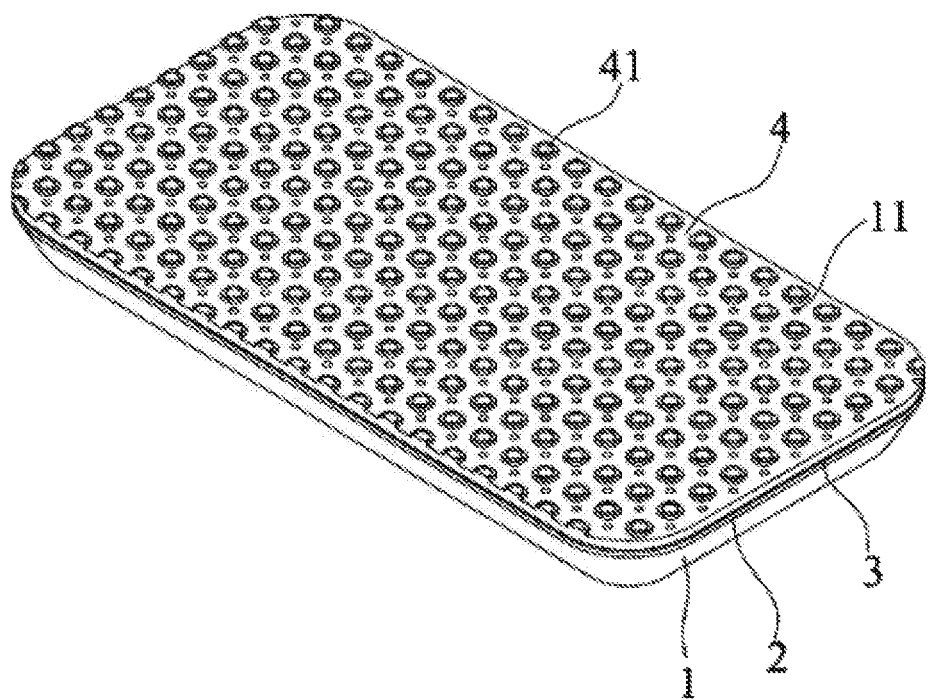
FIG. 5 illustrates a schematic diagram of the third embodiment of this invention.

FIG. 2 and FIG. 5 illustrate the best mode of this invention.

An environmentally friendly anti-slip self-skinning floor mat comprises PU self-skinning layer 1, middle layer 2, glue 3 and anti-slip layer 4.

Wherein, PU self-skinning layer 1 is directly foamed by the polyurethane foam material, which has advantages of high elasticity, good food feels, ease of cleaning, environmentally friendly and etc.

Middle layer 2 is a thin layer, and made of similar material as PU self-skinning layer 1 by which means middle layer 2 can bond with the PU self-skinning layer 1 by foaming in the mold with teeming method.

The Glue 3 can be used to bond middle layer 2 with anti-slip layer 4. Particularly, the glue can be VAC, Polyurethane adhesive, or natural latex and so on.

Anti-slip layer 4 can anti slipping. More particularly, it can be made of choroprenerubber, styrenebutadienerubber, heat-shrink elastomer foaming layer or rubber foaming layer.

When the layers are combined together, firstly, the middle layer 2 is sticked onto the top surface of anti-slip layer 4 via glue 3, and then setting a plurality of rivet holes 5 on the combined middle layer 2 and anti-slip layer 4. Referring to FIG. 2, rivet holes 5 can be round or rhombus or other shape. The combined middle layer 2 and anti-slip layer 4 is subsequently placed in a mold, and then the foaming molding is conducted on the top surface of the middle layer 2 to form the PU self-skinning layer 1, such that the bottom surface of the PU self-skinning layer 1 and the middle layer 2 are fixed together by foaming in the mold with teeming method, and finally an integrated part is formed. At the same time, with the expansion of the foaming, the bottom surface of PU self-skinning layer 1 will run through rivet holes 5 and stick out the bottom surface of anti-slip layer 4 and finally form a plurality of rivets 11. With the rivet connection of rivets 11 and rivet holes 5, PU self-skinning layer 1 is fixedly bonded with anti-slip layer 4 in a further step. Therefore, this invention provides double security of bonding between anti-slip layer 4 and PU self-skinning layer 1 (foaming in the mold by teeming method added with rivet connection), the final product would not causing bubbles, has a high resistance to the separation of different layers and more secure quality and longer service life. Moreover, the product has the advantages of higher elastic, better foot feels, anti-slip, ease of clean and environmentally friendly.

Figure 4:
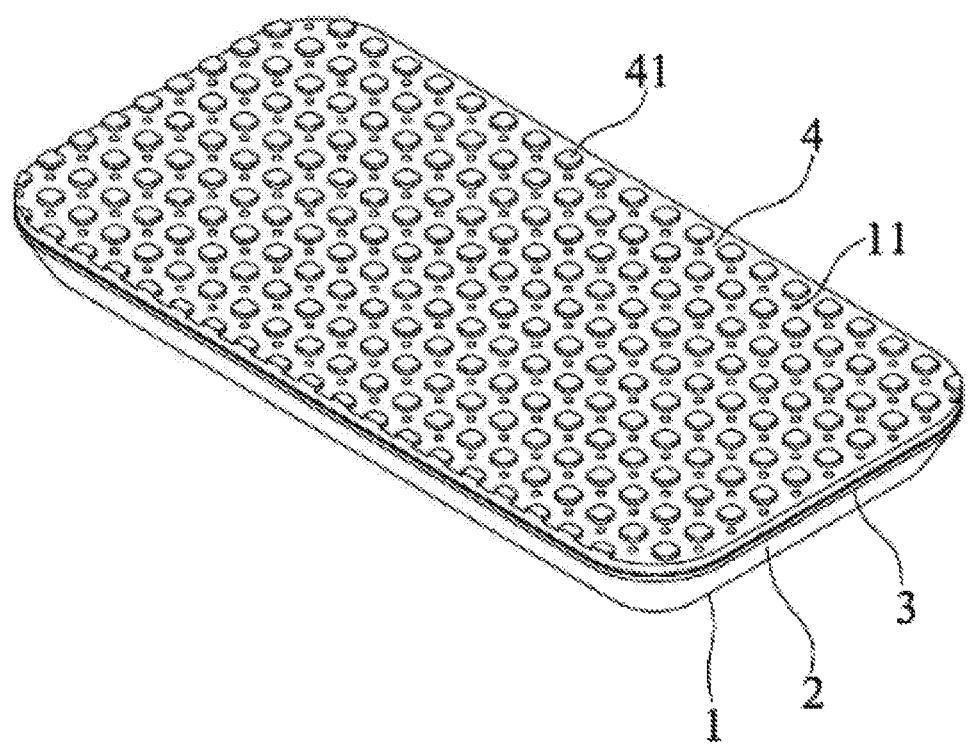
FIG. 4 illustrates schematic diagram of the second embodiment of this invention.

In order to have a better anti slipping effect, this invention can further have an anti-slip texture on the bottom surface of anti-slip layer 4. Referring to FIG. 4, there can be a plurality of anti-slip convex granule 41 on the bottom surface of anti-slip layer 4. Referring to FIG. 5, anti-slip convex granules 41 are formed on the bottom surface of anti-slip layer 4, and the bottom surface of anti-slip convex granules 41 are concaved to form a shape of a suction cup.

Although the present invention has been described with reference to the preferred embodiments, it is apparent to those skilled in the art that a variety of modification and changes may be made without departing from the scope of the patent for invention which is intended to be defined by the appended claims.

I claim:

1. An environmentally friendly anti-slip floor mat comprising,
    a PU self-skinning layer;
    a middle layer; and
    an anti-slap layer;
    wherein.
    the middle layer is a thin layer made of a same or similar material as the PU self-skinning layer;
    the PU self-skinning layer is foamed to bond with the middle layer;
    a top surface of the anti-slip layer is glued to the middle layer;
    a plurality of rivet holes are provided on the anti-slip layer glued with the middle layer;
    polyurethane is foamed on a top surface of the middle layer to form the PU self-skinning layer;
    a bottom surface of the PU self-skinning layer is bonded with the top surface of the middle layer;
    a bottom side of the PU self-skinning runs through the rivet holes and sticks out a bottom surface of the anti-slip layer to form a plurality of rivets so that the PU self-skinning layer and the anti-slip layer are further bonded together by a rivet connection.

2. The environmentally friendly anti-slip floor mat of claim 1, wherein, the middle layer is a PU foamed sponge layer.

3. The environmentally friendly anti-slip floor mat of claim 1, wherein, the glue is VAC, Polyurethane adhesive, or natural latex.

4. The environmentally friendly anti-slip floor mat of claim 1, wherein, the plurality of rivet holes on the anti-slip layer is round-shaped.

5. The environmentally friendly anti-slip floor mat as described in claim 1, wherein, the plurality of rivet holes on the anti-slip layer is rhombus-shaped.

6. The environmentally friendly anti-slip floor mat of claim 1, wherein, the anti-slip layer is made of choroprenerubber, styrenebutadienerubber, heat-shrink elastomer foaming layer or rubber foaming layer.

7. The environmentally friendly anti-slip self-skinning floor mat of claim 1, wherein, the bottom surface of the anti-slip layer has an anti-slip texture.

8. The environmentally friendly anti-slip self-skinning floor mat of claim 7, wherein, the bottom surface of the anti-slip layer has a plurality of anti-slip convex granules.

9. The environmentally friendly anti-slip floor mat of claim 7, wherein, the bottom surface of the anti-slip layer has a plurality of anti-slip convex granules, the bottom surface of each of the plurality of anti-slip convex granules is concave to form a suction-cup-like shape.

\* \* \* \* \*